United States Patent
Chernov et al.

(10) Patent No.: US 11,955,668 B2
(45) Date of Patent: Apr. 9, 2024

(54) SELF-POWERED LEAK DETECTION SENSOR

(71) Applicant: Haier US Appliance Solutions, Inc., Wilmington, DE (US)

(72) Inventors: Gregory Sergeevich Chernov, Louisville, KY (US); Matthew R. Hunter, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 278 days.

(21) Appl. No.: 17/482,766

(22) Filed: Sep. 23, 2021

(65) Prior Publication Data

US 2023/0101165 A1 Mar. 30, 2023

(51) Int. Cl.
*H01M 6/34* (2006.01)
*G01M 3/16* (2006.01)

(52) U.S. Cl.
CPC ............ *H01M 6/34* (2013.01); *G01M 3/16* (2013.01)

(58) Field of Classification Search
CPC ........... H01M 6/34; G01M 3/16; G01M 3/165
See application file for complete search history.

(56) References Cited

U.S. PATENT DOCUMENTS

| | | | |
|---|---|---|---|
| 9,383,289 B1* | 7/2016 | Meyer | G08B 25/14 |
| 10,458,876 B1 | 10/2019 | Billman | |
| 2004/0245101 A1* | 12/2004 | Willner | H01M 8/16 |
| | | | 204/403.01 |
| 2010/0213082 A1* | 8/2010 | Feldman | C12Q 1/006 |
| | | | 204/403.14 |
| 2019/0064029 A1* | 2/2019 | Kroker | G01M 5/0091 |
| 2019/0079037 A1* | 3/2019 | Jol | H01R 13/6683 |
| 2020/0253520 A1* | 8/2020 | Wang | A61B 5/002 |
| 2021/0048404 A1* | 2/2021 | Miyazawa | A61B 5/150358 |
| 2021/0181054 A1* | 6/2021 | Bischoff | G01M 3/165 |
| 2021/0317665 A1* | 10/2021 | Hilleringmann | B32B 3/08 |
| 2021/0364180 A1* | 11/2021 | Chen | G01M 3/04 |
| 2021/0381921 A1* | 12/2021 | Beguin | G01M 3/16 |
| 2022/0278380 A1* | 9/2022 | Takahashi | H01M 4/46 |
| 2022/0378628 A1* | 12/2022 | Feng | G01N 27/07 |

FOREIGN PATENT DOCUMENTS

| | | | |
|---|---|---|---|
| JP | 2013132518 A | * | 7/2013 |
| JP | 5851877 B2 | | 2/2016 |
| JP | 5859847 B2 | | 2/2016 |

* cited by examiner

*Primary Examiner* — John F Mortell
(74) *Attorney, Agent, or Firm* — Dority & Manning, P.A.

(57) ABSTRACT

Leak detection sensors, appliances configured to detect leaks and methods of detecting leaks are provided. The leak detection sensor is a self-powered leak detection sensor. The leak detection sensor includes a water-permeable medium and at least one electrochemical cell. The electrochemical cell can include a first electrode and a second electrode, and an electrolyte disposed between the electrodes, wherein in a dormant state, the electrolyte is in a solid, dry state. The electrochemical cell can enter an active state when exposed to water. The electrochemical cell can be configured to generate electrical power in the active state. The leak detection sensor can further include a peripheral electronic component configured to receive electrical power produced by the electrochemical cell. The self-powered leak detection sensor is configured for, and related methods include, detecting exposure to water in response to electrical energy generation of the electrochemical cell.

21 Claims, 4 Drawing Sheets

SELF-POWERED LEAK DETECTION SENSOR

FIELD OF THE INVENTION

The present subject matter relates generally to leak detection sensors for detecting a household water leak, and more particularly to such sensors which are self-powered and related methods of detecting leaks.

BACKGROUND OF THE INVENTION

Household appliances are utilized for a variety of domestic tasks such as washing dishes, washing laundry, or storing and/or dispensing water, e.g., in liquid or solid (ice) form. For example, a water-using household appliance may be a laundry appliance, such as a washer and/or dryer, a kitchen appliance, such as a refrigerator or a dishwasher, or other household appliance such as a water treatment (e.g., softening) system.

Such household appliances are typically connected to a domestic water supply which contains water under pressure to provide such water on demand as needed by the appliance. For example, the appliance may include a valve which is automatically opened according to a preprogrammed operation of the appliance, such as a fill portion of a wash cycle in a washing machine appliance or a rinse cycle of a dishwasher appliance. The connection between the appliance and the water supply is generally hidden from view, e.g., the connection may be located behind or underneath the appliance, such as behind or underneath a housing or cabinet of the appliance. In some cases, a water leak may develop in this hidden area behind or underneath the cabinet of the appliance and the leak may not be noticed until enough leaked water has accumulated to reach a more visible area, such as in front of the appliance.

Undetected household water leaks can result in serious and expensive property damage. Water leaks can occur at various locations of a house and can be caused by different factors, such as the failure of household plumbing or plumbing components, appliance malfunction, fixture overflow, external floods, etc. Even a small leak can cause significant damage if it is undetected for a prolonged period of time.

Leak detection sensors can aid in the timely detection of hidden leaks and prevent or reduce property damage. In order to notify a user about a water leak, in general, conventional sensors require electrical power. Thus, conventional leak detection sensors are limited by either the availability of electrical outlets and the length of the wire, or by the capacity of internal batteries used to power the sensor.

Accordingly, a self-powered sensor for detecting leaked water would be useful.

BRIEF DESCRIPTION OF THE INVENTION

Aspects and advantages of the invention will be set forth in part in the following description, or may be apparent from the description, or may be learned through practice of the invention.

In a first exemplary embodiment, a self-powered leak detection sensor is provided. The self-powered leak detection sensor includes a water-permeable medium and an electrochemical cell. The electrochemical cell can include a first electrode, a second electrode, and an electrolyte disposed between the electrodes. The electrolyte can be in a solid, dry state. The self-powered leak detection sensor can include a peripheral electronic component. The electrochemical cell can be configured to generate a voltage when exposed to water. The peripheral electronic component can be configured to be powered through the use of the energy produced by the electrochemical cell.

In another aspect of the invention, an appliance is provided. The appliance includes a chassis and a plurality of levelling legs. The appliance can further include a self-powered leak detection sensor. The self-powered leak detection sensor includes a water-permeable medium and an electrochemical cell. The electrochemical cell can include a first electrode, a second electrode, and an electrolyte disposed between the electrodes. In a dormant cell, the electrolytes can be in an inactive (solid, dry) state. The self-powered leak detection sensor can include one or more peripheral electronic components. The electrochemical cell can be configured to generate a voltage when exposed to water. The peripheral electronic components can be configured to be powered through the use of the energy produced by the electrochemical cell or to receive and analyze signals produced by the cell.

In a further aspect of the invention, a method of detecting a leak is provided. The method includes providing a self-powered leak detection sensor. The method can include positioning the self-powered leak detection sensor on or adjacent to a support surface. The method can include detecting water leaked on the self-powered leak detection sensor.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
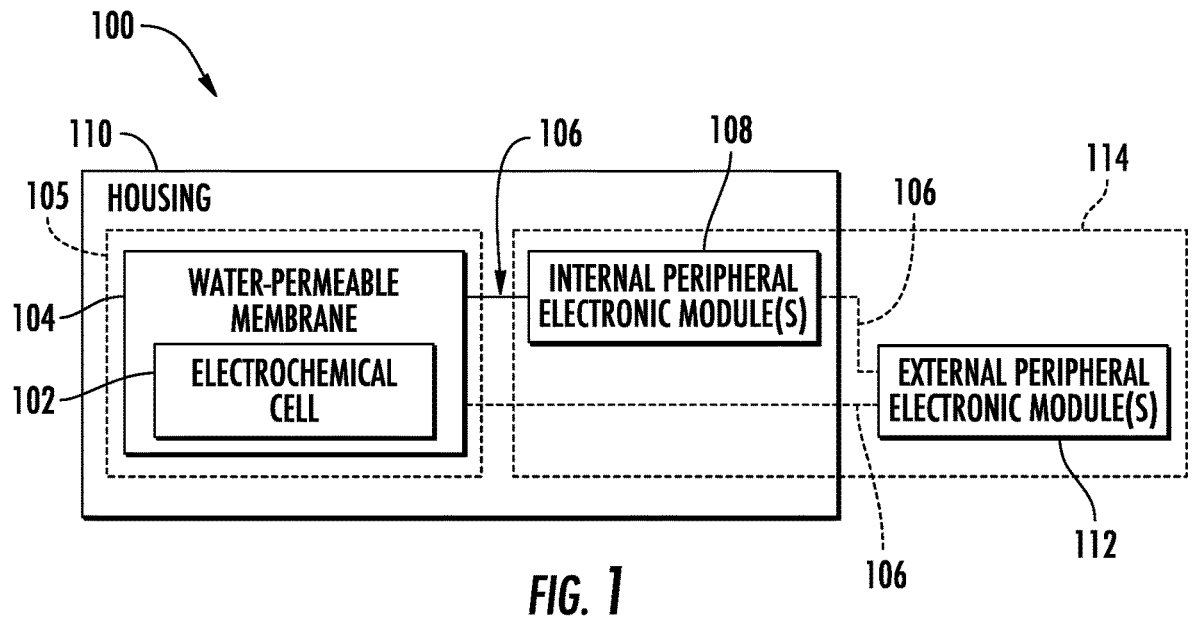
FIG. 1 provides a schematic diagram of a self-powered leak detection sensor in accordance with one or more example embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, terms of approximation, such as "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counterclockwise.

It should be understood that "water," as used herein, includes water having solutes, e.g., electrolytes, dissolved therein, such as is typically found in domestic water supply systems. Further, as used herein, "hard water" includes water having a high mineral content largely made up of calcium and magnesium carbonates, bicarbonates and sulfates, as may be commonly found in domestic water supply systems.

Additionally, it should be noted that references to "domestic" appliances herein can include clothes washing appliances, dishwashing appliances, and the like, and are not intended to exclude, e.g., washing machines in a laundromat, apartment building, hotel, dormitory, etc., or dishwasher appliances in a commercial kitchen or other commercial/industrial setting.

Turning now to FIG. 1, a first embodiment of a self-powered leak detection sensor 100 of the present invention is shown. The self-powered leak detection sensor 100 includes a water-permeable medium 104 and at least one self-powered energy source 102. The self-powered energy source 102 may be an electrochemical cell 102 as shown in FIG. 1. The electrochemical cell 102 may function as a battery, e.g., power supply, that is dormant in a dry state and generates a voltage when exposed to water.

The self-powered leak detection sensor 100 can further include an electronic circuit electronically connected to the self-powered energy source 102. The electronic circuit may include a connection 106 to one or more peripheral electronic modules such as internal peripheral electronic module(s) 108 and/or external peripheral electronic module(s) 112, e.g., communication modules, alert modules, etc. Internal peripheral electronic modules 108 can be included as a part of the self-powered leak detection sensor 100, and/or external peripheral electronic modules 112 can be external modules configured to be in operative communication with the self-powered leak detection sensor 100 via the electronic connection 106 of the electronic circuit. For instance, internal peripheral electronic modules 108 can be included with the housing 110. External peripheral electronic modules 112 can be external to the housing 110 and can be connected via a wired and/or wireless connection. The internal and/or external peripheral electronic modules 108 and 112 can form a leak notification unit 114, as shown in FIG. 1. The leak notification unit 114 can include one or more of an optical notification unit 116, an audible alarm 118, and a remote communication 120, e.g., wireless communication such as Wi-Fi, Bluetooth, Active or passive RFID (radiofrequency identification), or any other suitable communication. In some aspects of the invention, the peripheral electronic module(s) 108 and/or 112 can analyze an input from the self-powered energy source 102 and calculate the magnitude of a water leak, determine a relative location of a water leak, and/or distinguish between a water leak and expected surface wetness.

For instance, as will be described in further detail below, the external peripheral electronic module(s) 112 can be formed as a permanent, complex external unit. The peripheral electronic module(s) 112 can have a distinct power source such that the peripheral electronic module(s) 112 is not powered by the electrochemical cell 102. For example, the self-powered energy source 102 can generate electrical power to power an electrical connection, e.g., a signal, to the peripheral electronic module(s) 112, and the peripheral electronic module(s) 112 can receive the signal and use the distinct power source to power functions, e.g., alarm, notification, etc., of the peripheral electronic module 112. In some aspects of the present invention, the external peripheral electronic module(s) 112 can be formed as a part on another household appliance. The external peripheral electronic module(s) can be coupled to one or more leak detection sensors 100, e.g., simultaneously and/or sequentially in time. Moreover, the leak detection sensors 100 can be removably coupled to the external peripheral electronic module(s) 112 such that each leak detection sensor 100 can be replaceable. For example, as described in further detail below, each leak detection sensor 100 can be a disposable, e.g., single-use, product which can be replaced after it is spent.

Figure 2:
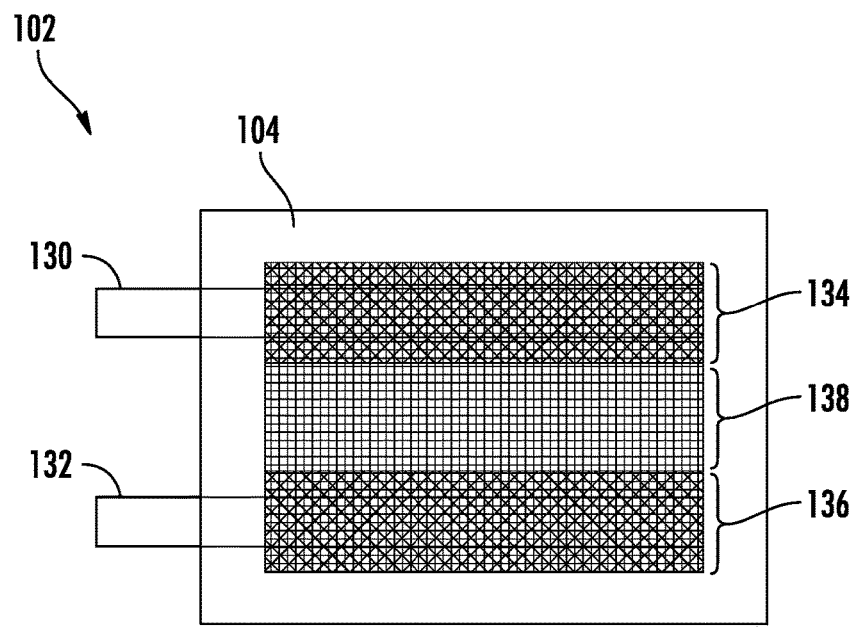
FIG. 2 provides a top view of an electrochemical cell of the self-powered leak detection sensor of FIG. 1.

FIG. 2 illustrates an exemplary embodiment of an electrochemical cell 102. The electrochemical cell 102 may be a galvanic cell that is dormant, i.e., does not generate energy, when dry and is activated when exposed to water. The electrochemical cell 102 includes at least a first electrode 130 and a second electrode 132, e.g., a negative electrode 130 (anode) and a positive electrode 132 (cathode). The electrodes 130, 132 are formed from materials with different standard reduction potentials. For instance, the electrodes 130, 132 may be formed from different materials. Alternatively, the electrodes 130, 132 may be formed from a same base material and doped with different materials, e.g., metals, metal powders, semiconductors, conductive polymers, or other suitable materials.

The electrodes 130, 132 can be made from any suitable electrically conductive materials. For instance, in one particular embodiment in which the water-permeable medium 104 forms a substrate for the electrochemical cell 102, the electrodes 130, 132 can be formed from an electrically conductive ink printed directly onto the water-permeable medium 104. The electrically conductive ink can be composed of a fluid matrix and include conductive particles, such as graphite, graphene, other allotropes of carbon, metal powders, conductive polymer(s), and/or other suitable materials. In other embodiments, the electrodes 130, 132 can be formed from conductive foil, conductive mesh, conductive wire, or any other conductive material suitable for collecting a current. For instance, a conductive foil, wire or mesh can be formed from electrically conductive metals such as copper, aluminum, or other suitable metals or nonmetallic materials. The conductive foil, wire or mesh may be doped with different metals, e.g., zinc as shown in FIG. 2.

The electrochemical cell 102 further includes at least one electrolyte that is compatible with the materials of the electrodes 130, 132. In other words, the one or multiple electrolytes can be chosen to facilitate galvanic reactions, to facilitate ion transfer, and/or to buffer pH within the electrochemical cell 102. The electrolyte(s) may be placed in specific locations within the electrochemical cell 102, i.e., a first electrolyte 134 in the vicinity of the first electrode or negative electrode 130 and a second electrolyte 136 in the vicinity of the second electrode or positive electrode 132. Additionally or alternatively, one or more additional electrolyte(s) 138 may be disposed between the first electrode 130 and the second electrode 132 in a manner that is non-specific to either the first or second electrodes 130, 132. The additional electrolyte(s) 138 can be used to improve capillarity of water-permeable medium 104, and/or to separate the first electrolyte 134 and second electrolyte 136 while allowing ionic current between the electrodes 130, 132. In one particular example, a strip of water-permeable medium 104 impregnated with sodium chloride (NaCl) can be disposed between the first electrode 130 and the second electrode 132, e.g., in addition to the electrolyte(s) 134, 136.

During the manufacturing of the electrochemical cell 102, the electrolyte(s) may be applied in a solid, dry form, i.e., not dissociated; applied, e.g., printed, as a gelled solution; applied, e.g., printed, as a paste containing powdered electrolytes; applied by liquid state impregnation; or any other suitable method. After the application the water content can be removed (evaporation, heat or chemical treatment) so that the electrolyte(s) enter a dormant undissociated state. For instance, when the water-permeable medium 104 forms a substrate for the electrochemical cell 102, the electrolyte(s) can be printed onto the water-permeable medium 104 and/or applied by liquid-state impregnation to the water-permeable medium 104 and dehydrated.

In one particular embodiment of the electrochemical cell 102, described for illustrative purposes, the positive electrode 132 may be formed from zinc-doped aluminum foil, and the negative electrode 130 may be formed from copper foil. The zinc-doped aluminum foil may be formed from a strip of aluminum foil coated with a mixture of zinc powder mixed with polyvinyl acetate. The electrolytes 134, 136, 138 of the illustrative electrochemical cell 102 may be formed as one or more strips of a paper material or other water absorbent substance that is impregnated with electrolyte compounds. For instance, as shown in FIG. 2, a first strip 134 of a water-permeable medium may be impregnated with copper sulfate ($CuSO_4$), a second strip 138 of a water-permeable medium may be impregnated with sodium chloride (NaCl), and a third strip 136 of a water-permeable medium may be impregnated with zinc sulfate ($ZnSO_4$). After the impregnation, the strips can be dehydrated. The dry strips containing the electrolytes may be positioned in the vicinity of the first electrode 130 and the second electrode 132, e.g., above, below, adjacent to, or between the first electrode 130 and second electrode 132.

The self-powered sensor 100 further includes a water-permeable medium 104 as described above. The water-permeable medium 104 is a porous medium that can transfer water and dissolved ions through capillary action. The material of the water-permeable medium 104 may be selected based on certain desirable properties such as capillarity, water transfer rate, hygroscopicity, wet and dry strength, ionic content and other properties. For instance, the water-permeable medium 104 can be made from foams, fabrics, felts, meshes, paper or paperboard, or other suitable materials. In one particular embodiment, the water-permeable medium 104 may be formed from a paper material such as paper or paperboard having an acceptable wet tear strength.

The wet strength of paper and paperboard is a measure of how well the web of fibers holding the paper together can resist a force of rupture when the paper is wet. Wet strength may be expressed as the ratio of wet to dry tensile force at break. Acceptable wet tear strength of a paper-based water-permeable medium 104 of the present invention may be at least ten percent (10%) of the original dry tensile strength or greater. For instance, the wet tear strength of the water-based permeable medium 104 may be in a range from about ten percent (10%) to about fifty percent (50%) of the original dry tensile strength, such as from about fifteen percent (15%) to about forty-five percent (45%), such as from about twenty percent (20%) to about thirty percent (30%).

Figure 3:
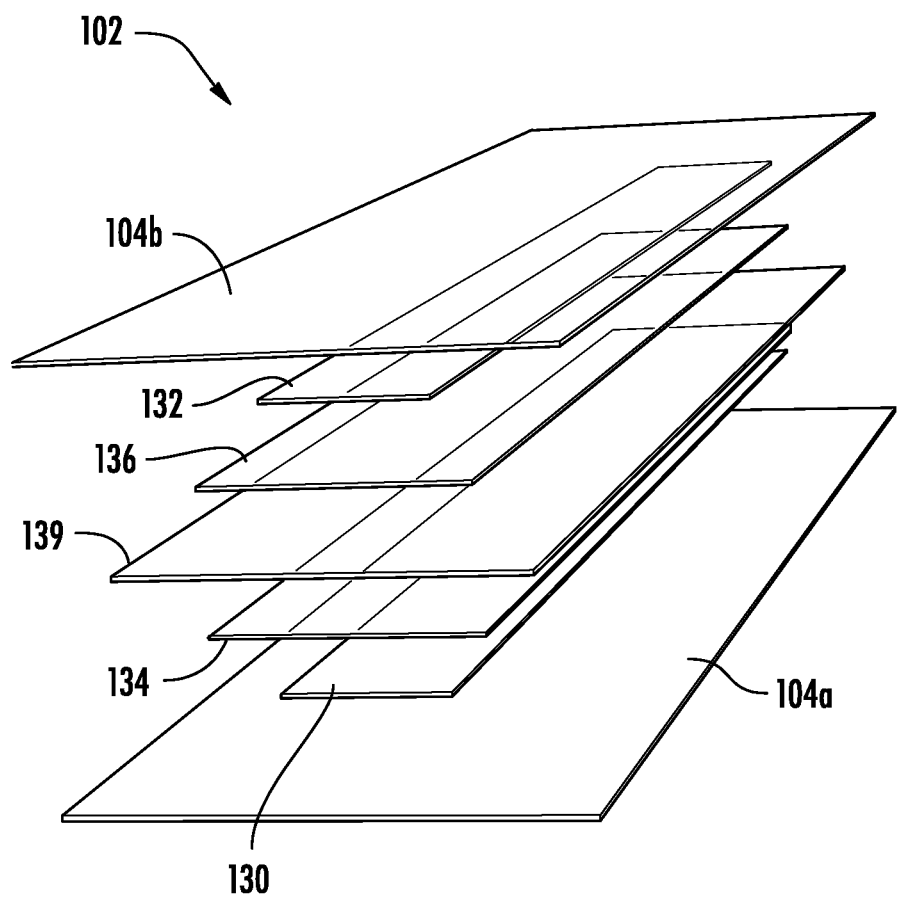
FIG. 3 provides an exploded view of a stacked electrochemical cell of the self-powered leak detection sensor of FIG. 1.

The water-permeable medium 104 of the self-powered leak detection sensor 100 of the present invention may be configured to surround at least a portion of the electrochemical cell 102 such that water may pass through the water-permeable medium 104 to the electrochemical cell 102. For instance, the water-permeable medium 104 may fully surround, encapsulate and/or enclose the electrochemical cell 102 as shown in FIGS. 2 and 3. As shown in FIG. 2 and FIG. 3, an electrochemical cell 102 may be sandwiched between multiple layers of water-permeable medium 104, e.g., a top layer 104a and a bottom layer 104b.

In one particular embodiment of the present invention, the water-permeable medium 104 is formed from paper, and the electrodes 130, 132 are formed from an electrically conductive ink printed onto the water-permeable medium 104. Additionally, the one or more electrolytes 134, 136, 138 are applied to the water-permeable medium 104 in the vicinity of the first electrode 130 and the second electrode 132, e.g., between the first electrode 130 and the second electrode 132 as shown in FIGS. 2 and 3. When exposed to liquid water, the one or more electrolytes 134, 136, 138 can become dissolved in the water, which activates the electrochemical cell 102.

Additionally or alternatively, the sensor 100 may have one or more additives incorporated or applied in order to control the capillarity, control water sensitivity, control the rate of chemical reactions of the electrochemical cell 102, improve structural properties, and/or insulate the electrochemical cell 102 from unwanted ionic noise. Such additives can improve the functionality of the self-powered sensor 100 such as by precisely controlling the condition in which the self-powered sensor 100 is activated.

For instance, one or more additives may be provided to form an immobilizing matrix for the electrolytes 134, 136, 138 in the electrochemical cell 102. Possible additives can include polyvinyl alcohols, polyvinyl acetates, polyacrylates, bentonites, polysaccharides, polyciliate, polypeptides, and other suitable substances. For example, one or more electrolytes in a solid form, e.g., powder, may be mixed with polyvinyl acetate to form a mixture, e.g., in the form of a paste, that can be applied to a water-permeable medium.

Additionally, various catalyzers and/or chemical aids can be used to optimize the rate of chemical reactions, to control water transfer properties through the water-permeable medium 104, and/or to improve, e.g., augment, structural properties of the assembly 105.

In another aspect of the invention, the water-permeable medium 104 may be impregnated with a crosslinking agent in order to reinforce and constrain the assembly 105 of the self-powered sensor 100. One example of a crosslinking agent may be sodium tetraborate. For instance, when the water-permeable medium 104 is impregnated with sodium tetraborate, polyvinyl acetate in an electrolyte paste may be crosslinked by the borate ions in the water-permeable medium 104, structurally reinforcing the assembly 105 of the self-powered sensor 100. This arrangement may render the final assembly 105 of the self-powered sensor 100 to have exceptional durability even when the water-permeable medium 104 is saturated with water for an extended duration of time, such as a leak event.

In some aspects of the invention, the sensor assembly 105 may include a semipermeable membrane that is permeable to liquid water and impermeable to dissolved ions or compounds within liquid water. This arrangement can provide the electrochemical cell 102 complete independence from external ionic noise. By preventing unwanted ions from entering the electrochemical cell 102, the electrochemical cell 102 may function with increased or improved efficiency. Moreover, using a semipermeable membrane to encapsulate the electrochemical cell 102 may prevent accidental release of internal chemicals, e.g., electrolytes 134, 136, 138, chemical aids of byproduct of galvanic reactions in the electrochemical cell 102.

For instance, particularly when the self-powered leak detection sensor 100 is used in household settings, it may be desirable to insulate the self-powered leak detection sensor from the presence of ions and/or compounds in hard water. A semipermeable membrane may enable liquid water to pass through while preventing hard water minerals such as calcium and magnesium carbonates, bicarbonates and sulfates from entering the electrochemical cell 102.

Another potential application of a semipermeable membrane within the self-powered leak detection sensor 100 may be internal to the electrochemical cell 102 in order to improve selective ionic transfer between the electrodes 130, 132.

Figure 4:
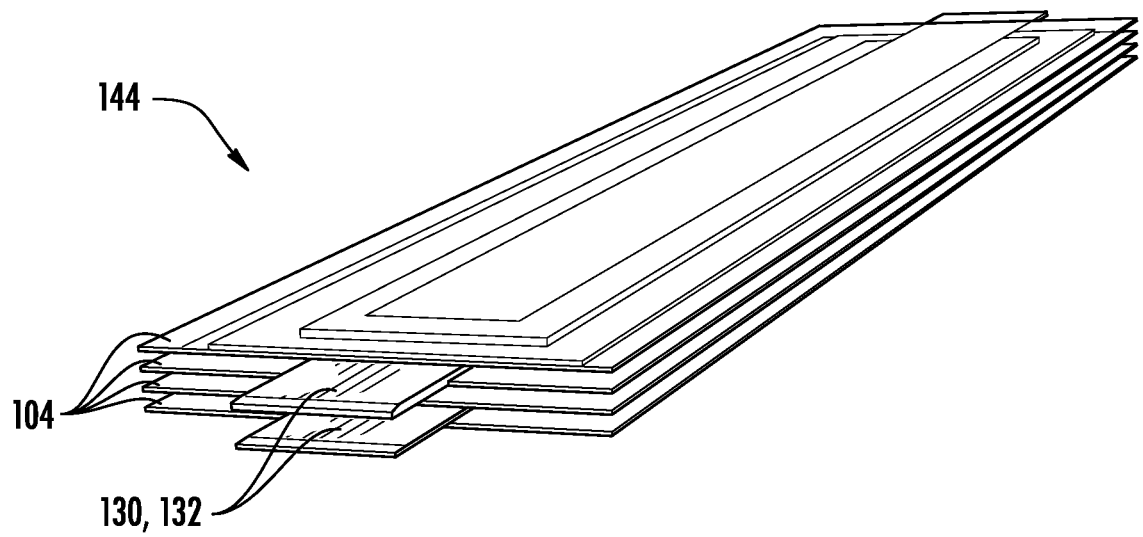
FIG. 4 provides a perspective view of a stack of multiple electrochemical cells of FIG. 3.

Similarly, as illustrated in FIG. 4, the assembly 105 of the self-powered leak detection sensor 100 may include a stack 144 of multiple electrochemical cells 102 and a semipermeable medium separating each of the electrochemical cells 102. In such an arrangement, multiple electrochemical cells 102 may be used to increase the output voltage of the self-powered leak detection sensor 100.

Figure 5:
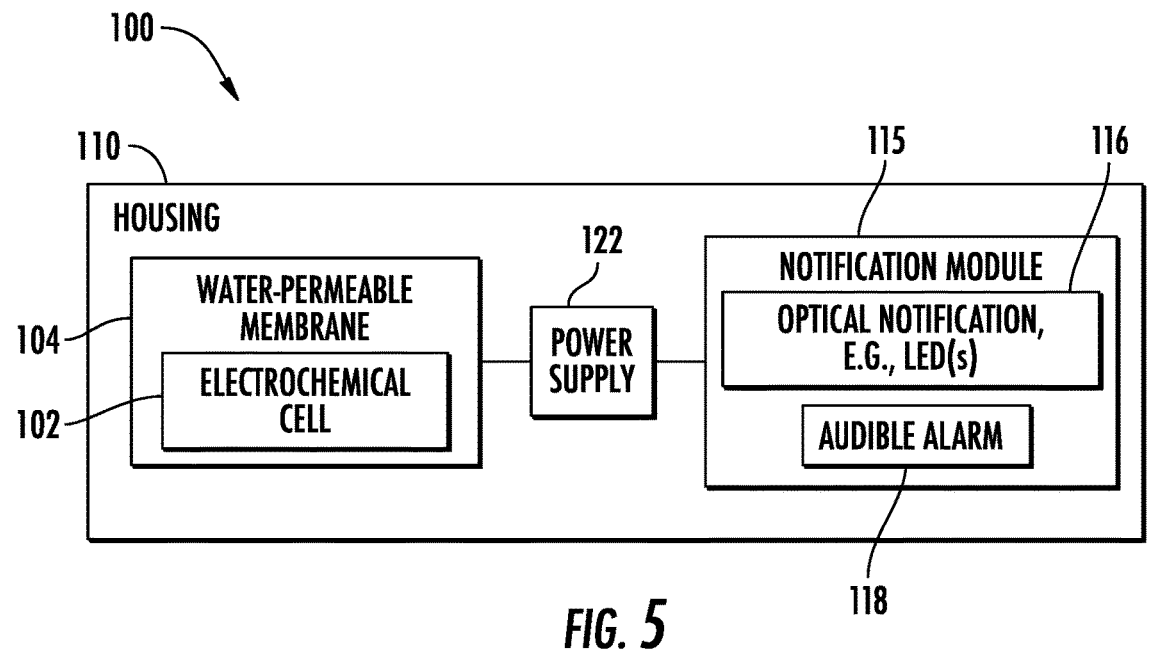
FIG. 5 provides a schematic diagram of a self-powered leak detection sensor having an internal leak notification module.
Figure 6:
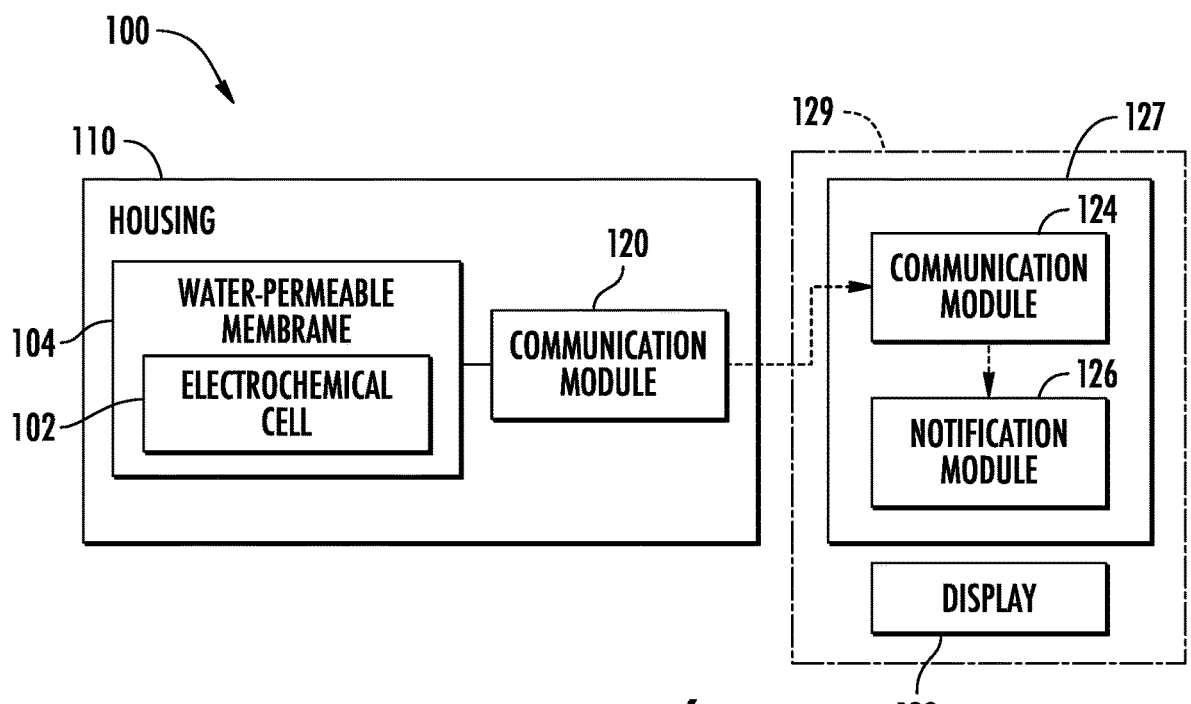
FIG. 6 provides a schematic diagram of a self-powered leak detection sensor in communication with an external leak notification module.

As shown in FIGS. 1, 5 and 6, the self-powered leak detection sensor 100 can include a power supply 122 coupled to the electrochemical cell 102. The power supply 122 can accumulate the energy produced by the electrochemical cell 102. For instance, as the amount of time the electrochemical cell 102 is exposed to water increases and/or as the quantity of water that the electrochemical cell 102 is exposed to increases, the electrochemical cell 102 can generate more energy. Moreover, the power supply 122 can be configured to recharge. In some aspects of the present invention, the power supply 122 can be incorporated into an external peripheral electronic module 112.

Further, the self-powered leak detection sensor 100 can include one or more internal peripheral electronic components 108. The internal peripheral electronic component(s) 108 can be disposed within the housing 110 of the sensor 100 along with the assembly 105. The internal peripheral electronic component(s) can be directly or indirectly electrically coupled to the electrochemical cell 102, e.g., by electrical connection 106. The electrical connection 106 can, in some embodiments, directly connect the electrochemical cell 102 with the internal peripheral electronic component(s) 108. Alternatively, the power supply 122 can be disposed between the electrochemical cell 102 and the internal peripheral electronic component(s) 108 such that the internal peripheral electronic component(s) 108 is directly connected with the power supply 122.

The internal peripheral electronic component(s) 108 can include one or more components such as a notification module 115 and/or a communication module 120. For instance, the notification module 115 can be one or more of an optical notification, e.g., one or more LED's (light emitting diodes) such as white, yellow, red, blue, or any suitable color(s). The notification module 115 can include an audible alarm 118 that can provide an audible alert to a user to notify the user of a leak. In some aspects of the invention, the notification module 115 can include both an optical notification 116 and an audible alarm 118. The communication module 120 can include any suitable wireless communication module such as Wi-Fi, Bluetooth, RFID (radio-frequency identification), or any other suitable remote wireless communication means.

Additionally, the self-powered leak detection sensor 100 can optionally be coupled to one or more external peripheral electronic component(s) 112. For instance, the external peripheral electronic component(s) 112 can include an external communication module 124 in operative communication with a communication module 120 as described above. Moreover, the external communication module 124 can be operatively coupled to an external notification module 126. The external communication module 124 and/or the external notification module 126 can be formed as a stand-alone unit 127 and/or can be integrated within an appliance, such as a clothes washer, a dishwasher, or other appliance liable to leak water. For instance, the external notification module 126 can be a display 128 on an appliance 129 such as a clothes washer, a dishwasher, or any other major appliance that can leak water.

The external notification module 126 can additionally or alternatively include any optical notification such as one or more LED's, an audible alarm, a wireless notification sent to a remote personal device such as a user app, email notification, or any other suitable electronic or analog notification.

The internal and/or external peripheral electronic modules 108 and 112 can be powered by energy generated by the electrochemical cell 102. For instance, when a water wets the water-permeable medium 104, the electrolytes 134, 136 can dissociate and initiate chemical reactions, e.g., an oxidation-reduction reaction, generating a magnitude of energy. When the magnitude of energy generated by the electrochemical cell 102 reaches or exceeds a minimum amount of energy required to power the peripheral electronic modules 108 and/or 112, the peripheral electronic modules 108 and/or 112 can be activated, e.g., powered on.

In some aspects of the invention, the peripheral electronic modules 108 and/or 112 may require a minimum amount of energy to accumulate prior to activating a notification. For instance, the power supply 122 may accumulate energy from the electrochemical cell 102 for a duration of time until a threshold energy level is reached prior to activating one of the peripherals 108 and/or 112. In one particular example, the power supply 122 may accumulate energy for a duration in a range from about 1 minute to about 20 minutes, e.g., from about 5 to 15 minutes, and then send a wireless burst signal, e.g., via a Wi-Fi connection, via the communication module 120. This process can be repeated such that periodic notifications are activated, e.g., every five minutes, or ten minutes, or any suitable interval of time (e.g., from 1 to 20 minutes, or any interval therein), sufficient to accumulate energy and activate notifications, until the leak is resolved.

In the absence of leaked water, the electrochemical cell 102 is in a dry, inactive state and thus is not providing electrical power to the power supply 122 or any peripheral electronic modules 108, 112. Thus, when the electrochemical cell 102 is activated by water from a leak, the electrochemical cell 102 initiates energy production to power the peripheral component 108 and/or external peripheral component 112, or to charge the power supply 122, or to produce an electronic signal that can be detected by the peripheral component 108 and/or external peripheral component 112, such that the leak may be detected.

In some aspects of the present invention, the peripheral electronic modules 108 and/or 112 can be configured to analyze an input from the electrochemical cell 102 and determine characteristics of a water leak such as the magnitude of the leak, location of the leak, and/or to distinguish between the leak and accidental wetness.

The housing 110 or other packaging of the self-powered leak detection sensor can optionally include one or more desiccants and/or water-soluble insulation. For instance, the assembly 105 including the water-permeable medium 104 and electrochemical cell 102 can include desiccants and/or water-soluble insulation to mitigate mishandling issues (e.g., accidental spills) and to prolong the shelf-life of the self-powered sensor 100. However, it is to be understood that the desiccants and/or water-soluble insulation can be used in any location in the sensor 100, including but not limited to the housing 110 and the external peripheral electronic module(s) 112, 127.

Figure 7:
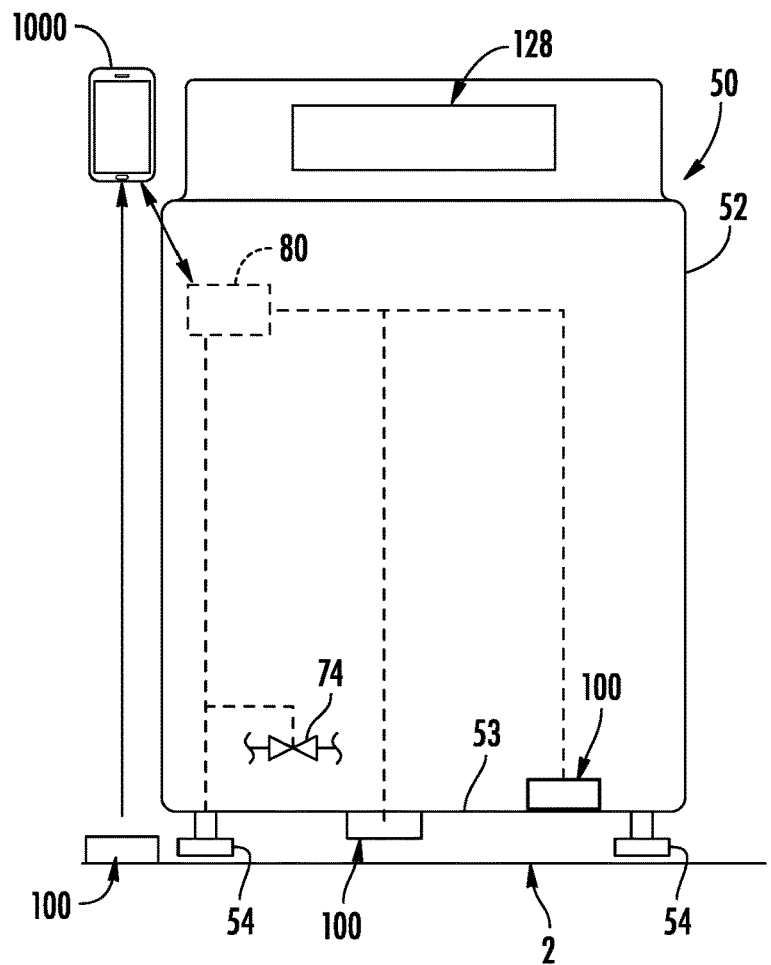
FIG. 7 provides a schematic view of an appliance in accordance with one or more example embodiments of the present disclosure.

A washing machine is illustrated in FIG. 7 as an example of a water-using household appliance and is not intended to limit the present disclosure to washing machines. It should be understood that the present disclosure may be used with any of several various types of water-using or water-collecting appliances. As an example of a water-collecting appliance, the present disclosure may be useful for detecting overflow from a condensation pan of an air conditioner unit or a refrigerator appliance. Examples of water-using appliances, in addition to the washing machine of FIG. 7, include dishwasher appliances and ice makers (either incorporated in a refrigerator appliance or stand-alone), among others. Thus, it is to be understood that the leak detecting features of the present disclosure may be incorporated into any of a variety of household appliances.

While described in the context of specific embodiments of washing machine appliance 50, using the teachings disclosed herein it will be understood that washing machine appliance 50 is provided by way of example only. Other laundry appliances having different configurations (such as horizontal axis washing machine appliances, or various clothes dryer appliances), different appearances, and/or different features may also be utilized with the present subject matter as well.

Turning now to FIG. 7, a household appliance 50 is schematically illustrated, which may be, for example, a washing machine appliance or may be any one of numerous other water-using or water-collecting appliances, e.g., a refrigerator, an ice maker, a dishwasher, or an air conditioner unit, as described above, among other possible example appliances. In FIG. 7 and additional FIGS, reference numbers for like or similar features, e.g., the cabinet 52, are repeated for purposes of illustration only and without intending to limit such features to the washing machine features of FIG. 3. For example, the cabinet 52 in FIG. 3 may also or instead refer to a similar cabinet which is part of a dishwasher, refrigerator, etc.

As may be seen in FIG. 7, in some embodiments, the appliance 50 may include a plurality of levelling legs 54. For example, as illustrated in FIG. 3, the appliance 50 may include levelling legs 54. The levelling legs 54 may rest on a support surface 2 upon which the appliance 50 is supported.

Operation of washing machine appliance 50 is controlled by a processing device or controller 80, that is operatively coupled to input selectors located on the washing machine (not shown) for user manipulation to select washing machine cycles and features. Controller 80 may further be operatively coupled to various other components of appliance 50, such as a flow regulator (including valve 74), motor, pressure sensor, speed sensor, other suitable sensors, etc. (not shown). In response to user manipulation of the input selectors, controller 80 may operate the various components of washing machine appliance 50 to execute selected machine cycles and features.

The controller 80 can be a "processing device" or "controller" and may be embodied as described herein. As used herein, "processing device" or "controller" may refer to one or more microprocessors, microcontroller, application-specific integrated circuits (ASICS), or semiconductor devices and is not restricted necessarily to a single element. The controller 80 may be programmed to operate appliance 50 by executing instructions stored in memory. The controller may include, or be associated with, one or more memory elements such as for example, RAM, ROM, or electrically erasable, programmable read only memory (EEPROM). For example, the instructions may be software or any set of instructions that when executed by the processing device, cause the processing device to perform operations. Controller 80 can include one or more processor(s) and associated memory device(s) configured to perform a variety of computer-implemented functions and/or instructions (e.g., performing the methods, steps, calculations and the like and storing relevant data as disclosed herein). It should be noted that controllers 80 as disclosed herein are capable of and may be operable to perform any methods and associated method steps as disclosed herein.

Also as illustrated in FIG. 7, the controller 80 may be in operative communication with the chassis 53 and a water supply valve 74 of the appliance 50. For example, such operative communication may include the water supply valve 74 electrically coupled, such as through a wire as indicated by dashed lines in FIG. 7, to the controller 80 whereby the controller 80 can monitor or detect electrical properties or conditions of the water supply valve 74. The water supply valve 74 of FIG. 7 may be the only or sole water supply valve in the appliance in some embodiments, or may be one of multiple water supply valves. In embodiments which include multiple water supply valves, the controller 80 may be in operative communication with both or all of the water supply valves. The controller 80 may be in operative communication with the water supply valve 74 such that the controller 80 may actuate the valve 74, e.g., the controller 80 may open or close the water supply valve 74 to selectively permit or obstruct a flow of water into the appliance 50.

One or more self-powered leak detection sensors 100 can be positioned in, on, adjacent to or nearby the appliance 50 to detect when a leak occurs. For instance, a sensor 100 of the present invention can be attached to the chassis 53 of the appliance, e.g., on an inner surface or an outer surface of the chassis 53 as illustrated in FIG. 7. In some aspects of the invention, the self-powered leak detection sensor 100 can be integrated, e.g., permanently or removably, into the appliance 50. Additionally or alternatively, the self-powered leak detection sensor 100 can be a stand-alone unit which can be disposably used in conjunction with the appliance 50. For instance, the self-powered leak detector sensor 100 can be positioned on a support surface 2, e.g., a floor, shelf, cabinet, or other support surface upon which the appliance 50 is supported, as shown in FIG. 7. The self-powered leak detection sensor 100 can be disposable and removably coupled to the appliance 50 or support surface 2, such that after the self-powered leak detection sensor 100 detects a leak event, the spent self-powered leak detection sensor 100 can be replaced.

As mentioned above, the controller 80 may be in operative communication with the user interface of the appliance 50, such as the display 128 thereon. The controller 80 can be in operative communication with the self-powered leak detection sensor 80 in some embodiments of the present invention. In some embodiments, the controller 80 may also or instead be in operative communication with a remote user interface 1000. For example, as depicted in FIG. 7, the controller 80 may communicate wirelessly with the remote user interface device 1000. The remote user interface device 1000 may include one or more of a cloud service, smartphone, tablet, personal computer, wearable device (e.g., smart watch), a smart home system, or other similar user interface devices. The communication with 1000 can be performed directly or through a local or cloud hub.

When a leak occurs, a puddle of water may form on the chassis 53 of the appliance 50 and/or underneath the appliance 50, e.g., on the support surface 2 on which the appliance 50 is supported. If the water leaks underneath the appliance 50, water may extend between the levelling legs 54, while also not extending beyond the footprint of the cabinet 52. When the puddle of water is thus obscured by the cabinet 52, the leak may be more difficult to detect. Moreover, when a leak occurs inside the chassis 53 of the appliance 50, the leak may be totally undetectable by a user. Accordingly, the appliance 50 may be configured for and/or methods according to the present disclosure may include detecting the leak based on activation of the electrochemical cell 102 of the self-powered leak detection sensor 100, where the water in the puddle activates the electrochemical cell 102 as described in detail above.

Figure 8:
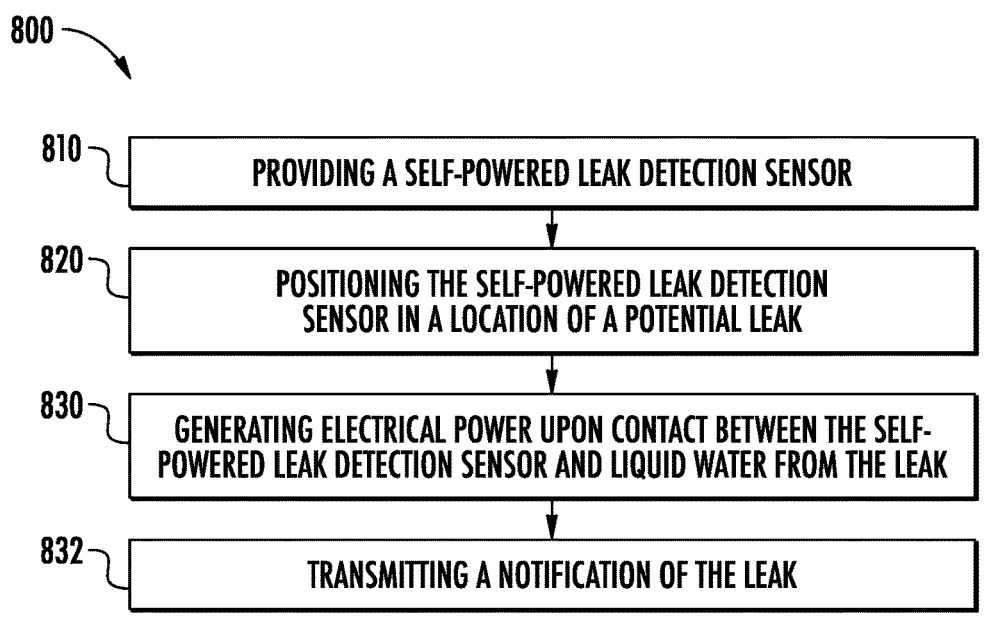
FIG. 8 provides a flow chart illustrating a method of detecting a leak in accordance with one or more example embodiments of the present disclosure.

Embodiments of the present disclosure include methods of detecting a water leak event, such as from an appliance such as the exemplary appliances 50 described above. An exemplary method 800 of detecting a leak according to one or more embodiments of the present disclosure is illustrated in FIG. 8. In some embodiments, e.g., as illustrated in FIG. 8, the method 800 may include a step 810 of providing a self-powered leak detection sensor 100. For example, the self-powered leak detection sensor 100 can be the sensor 100 as described in detail above. Thus, when the self-powered leak detection sensor is dry, the electrochemical cell 102 is in a dormant state. When the self-powered leak detection sensor 100 is exposed to liquid water, such as from a leak from an appliance, the electrochemical cell 102 can generate electrical energy. The method can include a step 820 of placing the self-powered leak detection sensor 100 in a location of a potential leak. The method 800 can include a step 830 of detecting a leak because of electrical activation of a notification module, where the notification module is powered, directly or indirectly, by energy generated by the electrochemical cell 102 of the self-powered leak detection sensor 100. For instance, in step 830, electrical power is generated upon contact between the self-powered leak detection sensor and liquid water from the leak. Additionally, it should be noted that references to "domestic" appliances herein are not intended to exclude, e.g., washing machines in a laundromat, apartment building, hotel, dormitory, etc., or dishwasher appliances in a commercial kitchen or other commercial/industrial setting. Further, the method 800 can include a step 832 of transmitting a notification of the leak, e.g., via peripheral electronic module(s) 108 and/or 112.

Continuing with method 800 illustrated in FIG. 8, in at least some embodiments, the method 800 may also include one or more actions after detecting the leak, such as to mitigate potential effects of the leak. For example, in some embodiments, the method 800 may also include closing a water supply valve of the appliance after detecting leaked water on the support surface. As another example, in some embodiments, the method 800 may also include transmitting a user notification, e.g., to a display on the appliance and/or to a remote user interface device, after detecting leaked water on the base surface, e.g., as illustrated at step 832 in FIG. 8.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A self-powered leak detection sensor comprising:
   a water-permeable medium;
   an electrochemical cell comprising a first electrode and a second electrode, and an electrolyte disposed between the electrodes, wherein in a dormant state, the electrolyte is in a solid, dry state;
   a semi-permeable membrane surrounding the water-permeable medium or the electrochemical cell, wherein the semi-permeable medium is permeable to water and impermeable to ions dissolved in water;
   wherein the electrochemical cell enters an active state when exposed to water, wherein the electrochemical cell is configured to generate electrical power in the active state.

2. The self-powered leak detection sensor of claim 1, wherein at least one of the electrodes comprises a conductive ink in contact with the water-permeable medium.

3. The self-powered leak detection sensor of claim 1, wherein the first electrode and the second electrode are made from different materials.

4. The self-powered leak detection sensor of claim 1, wherein the first electrode is formed from a base material doped with a first additive and the second electrode is formed from a base material identical to the base material of the first electrode and doped with a second additive that is different from the first additive.

5. The self-powered leak detection sensor of claim 1, wherein the water-permeable medium is configured to deliver water from a leak to the electrochemical cell.

6. The self-powered leak detection sensor of claim 1, further comprising a housing surrounding the water-permeable medium and the electrochemical cell.

7. The self-powered leak detection sensor of claim 1, further comprising a peripheral electronic component configured to receive electrical power produced by the electrochemical cell.

8. The self-powered leak detection sensor of claim 7, wherein the peripheral electronic component is configured to be powered by the electrical power produced by the electrochemical cell.

9. The self-powered leak detection sensor of claim 7, wherein the peripheral electronic component comprises a power supply configured to accumulate the electrical power produced by the electrochemical cell.

10. The self-powered leak detection sensor of claim 7, wherein the peripheral electronic component is configured to generate a notification of a water leak event to a user after the power supply has accumulated a threshold energy level.

11. The self-powered leak detection sensor of claim 7, wherein the peripheral electronic component is configured to generate a notification of a water leak event to a user.

12. The self-powered leak detection sensor of claim 11, wherein the peripheral electronic component comprises one or more of an audible alarm, an optical notification, and remote wireless communication.

13. The self-powered leak detection sensor of claim 7, wherein the peripheral electronic component comprises an electrical connection configured to connect with an external peripheral electronic module.

14. The self-powered leak detection sensor of claim 7, wherein the electrical power produced by the electrochemical cell in the active state is configured to power the electrical connection between the peripheral electronic component and the external peripheral electronic module, further wherein the external peripheral electronic module comprises a distinct power source.

15. The self-powered leak detection sensor of claim 1, wherein the peripheral electronic component is configured to analyze an input from the electrochemical cell and calculate the magnitude of a water leak, determine a relative location of a water leak, and/or distinguish between a water leak and expected surface wetness.

16. The self-powered leak detection sensor of claim 1, wherein the self-powered leak detection sensor is consumable.

17. An appliance comprising:
an appliance unit comprising a water source; and
a self-powered leak detection sensor comprising:
  a water-permeable medium;
  an electrochemical cell comprising a first electrode and a second electrode, and an electrolyte disposed between the electrodes, wherein in a dormant state, the electrolyte is in a solid, dry state;
  a semi-permeable membrane surrounding the water-permeable medium or the electrochemical cell, wherein the semi-permeable medium is permeable to water and impermeable to ions dissolved in water;
  wherein the electrochemical cell enters an active state when exposed to water,
  wherein the electrochemical cell is configured to generate electrical power in the active state.

18. A method of detecting a water leak from an appliance, the method comprising steps of:
providing a self-powered leak detection sensor;
positioning the self-powered leak detection sensor in a location of potential leak in, on, or adjacent to the appliance;
generation of electrical power upon contact with liquid water from the leak; and
detecting water leaked as function of generated power by the self-powered leak detection sensor.

19. The method of claim 18, further comprising transmitting a notification via a notification module coupled to the self-powered leak detection sensor after detecting the leaked water.

20. The method of claim 19, wherein transmitting the notification comprises transmitting a user notification to a display.

21. The method of claim 19, wherein transmitting the notification comprises wirelessly transmitting a user notification to a remote user interface device.

* * * * *